US005098065A

United States Patent [19]

Beletich

[11] Patent Number: 5,098,065

[45] Date of Patent: Mar. 24, 1992

[54] MINE EXTRACTION DEVICE AND METHOD

[76] Inventor: Aldo Beletich, 14 Victor Avenue, Valentine, New South Wales, 2280, Australia

[21] Appl. No.: 662,393

[22] Filed: Feb. 27, 1991

Related U.S. Application Data

[63] Continuation of Ser. No. 369,050, Jun. 20, 1989, abandoned.

[51] Int. Cl.[5] ..... B65G 7/00

[52] U.S. Cl. ..... 254/1; 254/93 R; 254/108; 254/133 A

[58] Field of Search ..... 254/29 R, 108-112, 254/99, 133 A, 134, 3 R, 264, 206, 237; 405/184, 154, 132, 50

[56] References Cited

U.S. PATENT DOCUMENTS

| | | | |
|---|---|---|---|
| 106,926 | 8/1870 | Farnsworth | 254/99 |
| 942,592 | 12/1904 | Schneider | 254/133 A |
| 973,752 | 10/1910 | Cahn et al. | 254/29 R |
| 1,015,893 | 1/1912 | Keeler | 254/29 R |
| 2,646,963 | 7/1953 | Usher | 254/108 |
| 2,935,298 | 5/1960 | Wilwerding | 254/29 R |
| 3,207,326 | 9/1965 | Enix | 254/29 R |
| 3,226,088 | 12/1965 | Habighorst | 254/134.3 R |
| 3,298,448 | 1/1967 | Kull | 254/29 R |
| 3,348,811 | 10/1967 | Pierce | 254/134.3 R |
| 4,030,699 | 6/1977 | Heimke | 254/108 |
| 4,506,867 | 3/1985 | LeGlue | 254/108 |
| 4,544,135 | 10/1985 | Albaugh | 254/108 |

*Primary Examiner*—Robert C. Watson
*Attorney, Agent, or Firm*—Darby & Darby

[57] ABSTRACT

A mining equipment extraction device (1), comprising: a base member (4);

an arm (6), pivotally connected at a first end (5) thereof to said base member (4), and adapted to engage a mine roof at a second end (12) thereof, said arm (6) being adjustable in length and/or angular position;

a rack (13), having a first end which is adapted to be connected to the mining equipment to be extracted from the mine;

a moving mechanism (17) operatively connected via pistons (20) to said base member (4) and adapted to be engaged via a pawl (16) with said rack (13), such that, said moving mechanism (17) may be operated to move said rack (13) relative to said base member (4) and consequently move said mining equipment.

11 Claims, 2 Drawing Sheets

MINE EXTRACTION DEVICE AND METHOD

Figure 1:
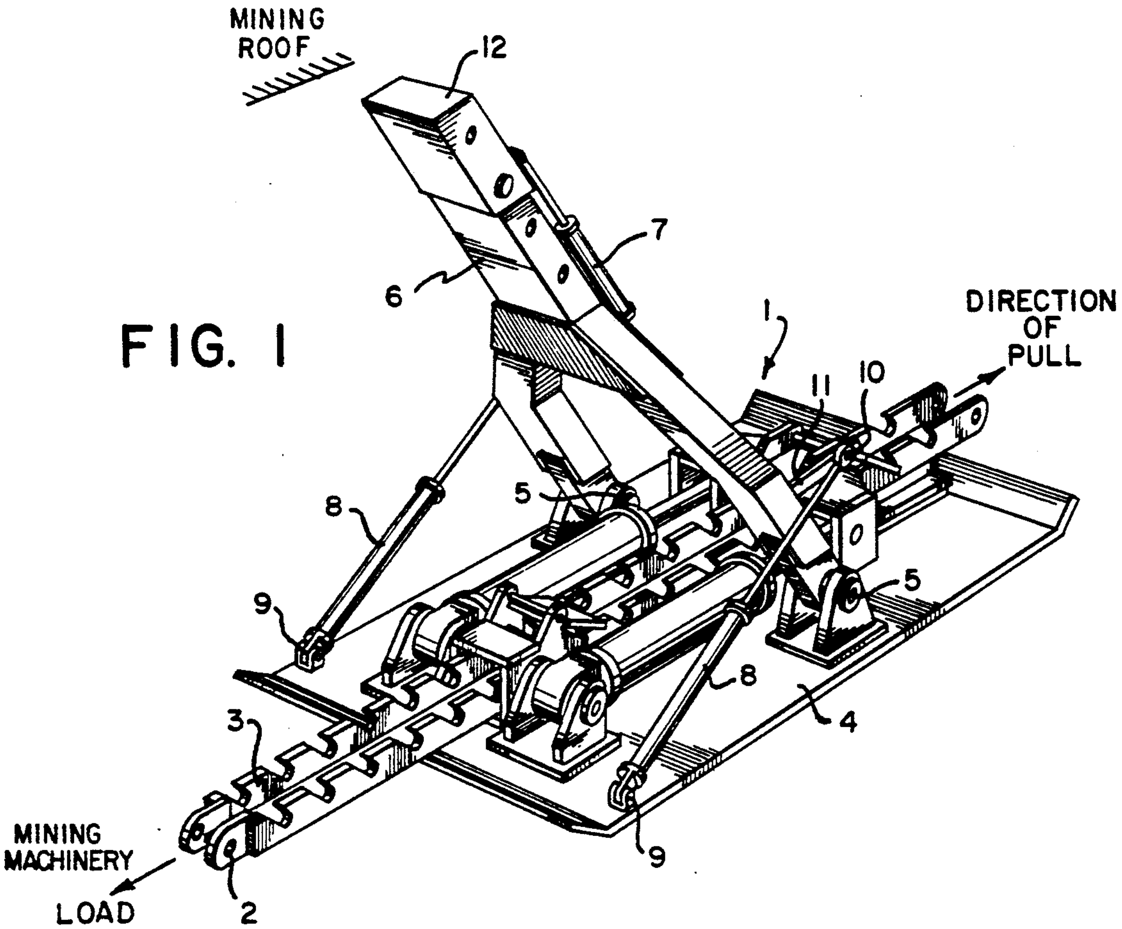

This is a continuation of application Ser. No. 369,050, filed June 20, 1989 now abandoned.

The present invention relates to an extraction device, and in particular to a device for the extraction of mining equipment from the roadway of a mine.

Presently, there is no known device which is particularly designed for the extraction of mining equipment from the roadway of a mine. In the mining industry, access to a mineral deposit is generally gained by horizontal tunnels being driven into a mountainside. Such horizontal tunnels then have a number of 'roads' extending therefrom, through which access is obtained for the movement of equipment therethrough. Much of this equipment is, at best, difficult to manouver through the roads, and it is quite common for such machinery to break down or become bogged or buried within these roads. During the extraction of minerals, the roof of the mine collapses, and in some cases the fall overruns onto the mining machinery. To extract such equipment from the roadway of the mine, it has previously been necessary to erect steel sets around the machine, and remove the fallen material by hand to enable the machine to be removed. It was then necessary to attach the equipment to a pulley type arrangement which was constructed within the mine. A number of support pillars were supported between the floor and the roof of the mine roadway, and a rope or chain attached to the machinery was provided around the supports in a pulley-like arrangement. The other end of the rope or chain was then affixed to a tractor to drag the broken machinery through the road.

This prior art method of extracting broken machinery from a mine roadway has a number of drawbacks. Firstly, it is a time consuming process to physically connect the support pillars into position by firmly affixing same between the floor and the roof of the mine roadway. When the rope or chain is drawn around the pillars, the pillars have a tendency to come unfixed at their upper or lower ends, which could result in the collapse of the roof of the mine roadway.

The pillars have an unbalancing effect as the force is applied to them which could easily render a dangerous situation resulting in the collapse of the roof of the mine. Thus, utilising this known method, puts the safety of miners at risk, as well as the actual machinery which is broken or buried.

The present invention seeks to overcome the disadvantages of the prior art in order to provide a mine extraction device which is designed for the extraction of mining equipment from the roadway of a mine.

In one broad form, the present invention provides a mining extraction device, comprising:

- a base member;
- an arm, pivotally connected at a first end thereof to said base member, and adapted to engage a mine roof at a second end thereof, said arm being adjustable in length and/or angular position;
- a rack, having a first end which is adapted to be connected to the mining equipment to be extracted from the mine;
- a moving mechanism operatively connected to said base member and adapted to be engaged with said rack, such that, said moving mechanism may be operated to move said rack relative to said base member and consequently move said mining equipment In a further form, the present invention provides a method of operating a mining equipment extraction device as hereinbefore defined comprising the steps of:

- providing said extraction device within said mine;
- extending said arm such that said first end is engaged with said mine roof;
- connecting said mining equipment to said first end of said rack; and,
- operating said moving mechanism such that said rack is moved in a first direction to consequently move said mining equipment in said first direction.

Figure 2A:
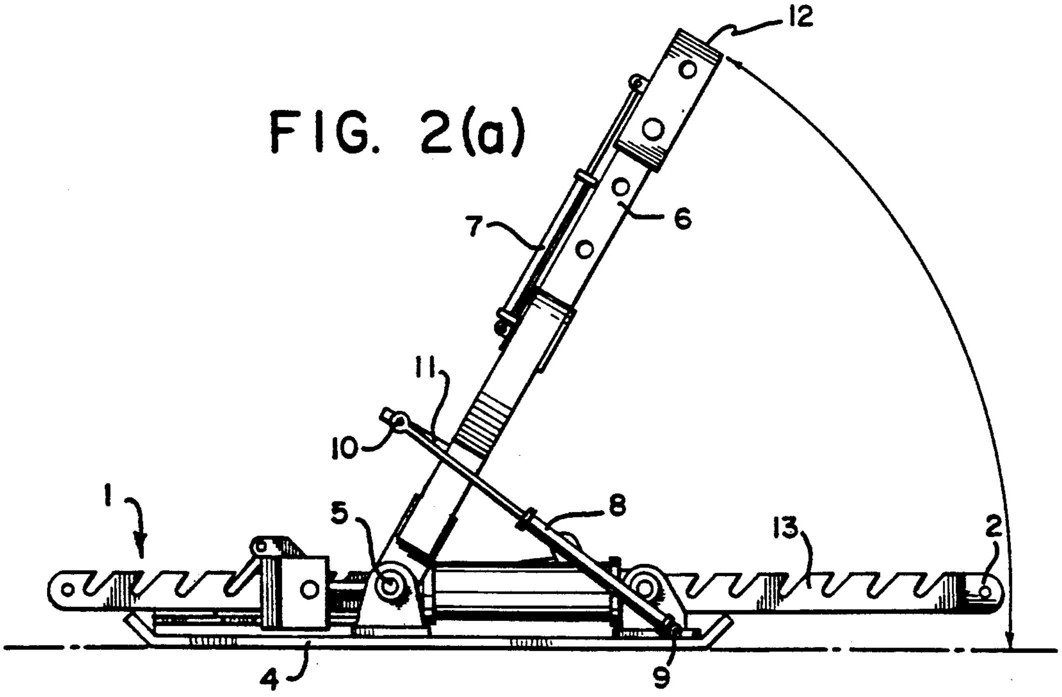
Figure 2B:
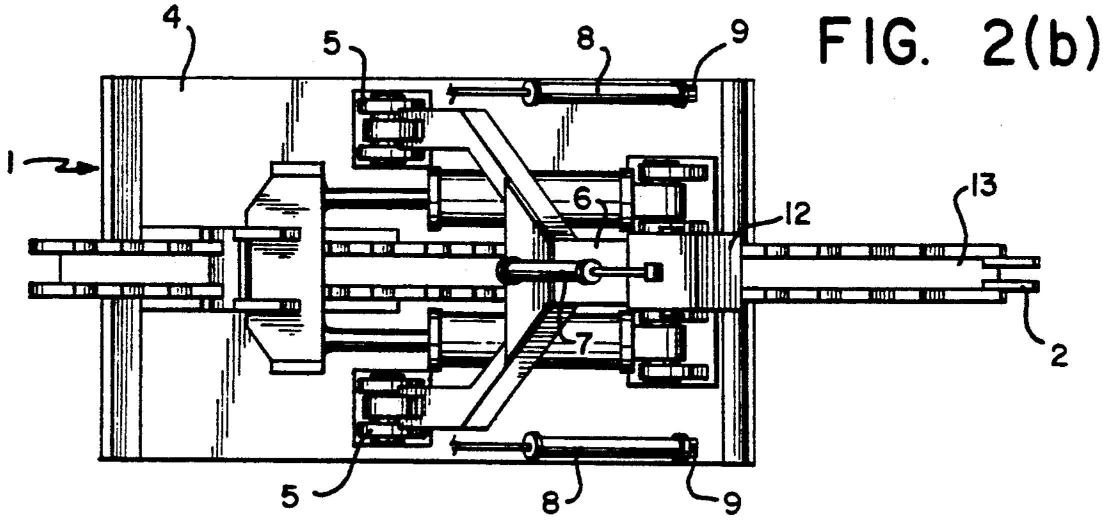
Figure 3A:
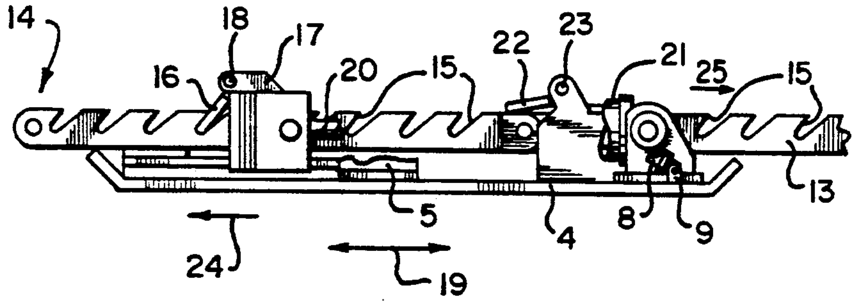
Figure 3B:
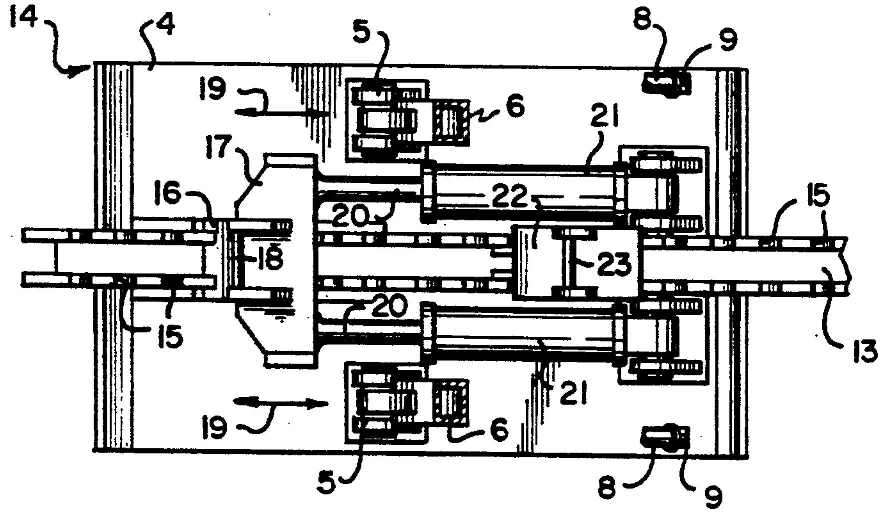

The present invention will become more fully understood from the following detailed description of a preferred embodiment thereof in connection with the accompanying drawings, in which:

FIG. 1 shows a mine extraction device which may be used to extract mining machinery from a mine roadway;

FIGS. 2(*a*) and 2(*b*) illustrate elevational and plan views of the mine mechanism of the mine extraction device;

FIGS. 3(*a*) and 3(*b*) illustrate elevational and plan views of the pulling mechanism of the mine extraction device.

In FIG. 1 is shown the mining extraction device in accordance with the present invention. The figure illustrates the mining extraction device, generally designated by the numeral 1, such that a machinery is able to be connected to an end 2 thereof, by means of the rack 3. As the mining extraction device 1 is operated, the rack 3 is moved by the mining extraction device, to consequently drag the machinery connected to the end 2, as required.

In FIG. 2, is detailed the mining extraction device 1 of FIG. 1. FIG. 2(*a*) illustrates an elevational view of the device, whilst FIG. 2(*b*) shows a plan view of same. The mining extraction device 1, comprises a base 4 in the form of a slide bar, such that the device 1 may be towed to its required position by a tractor or the like. Pivotally affixed to a substantially central portion of the base 4 at pivot points 5, is the arm 6, which is adjustable in both length and angular disposition. The hydraulic cylinders 7 allow adjustment along the longitudinal axis of the arm 6. A further set of hydraulic cylinders 8 which are pivotally connected at a first end to the base 4 via pivot points 9, and at a second end to the arm 6 via pivot points 10 and an extension piece 11, allow for angular adjustment of said arm over a wide range of angles from the horizontal.

In use, the mining extraction device 1 is dragged or towed into a mine roadway along the base 4, and the hydraulic cylinders 7 and 8 are operated to raise the arm 6 to an angle preferably between about 60 and 80 degrees, until the extremity 12 of the arm 6 is placed into firm contact with the roof of the mine roadway.

The mining extraction device 1 also comprises a rack 13 and the associated pulling cylinders and engaging pawls. Whilst these features are illustrated in FIG. 2, they are more clearly shown in FIG. 3.

In FIG. 3 is detailed the Pulling mechanism of the mining extraction device with the arm 6 omitted for improved clarity and explanation. FIG. 3(*a*) shows an elevational view of the pulling mechanism, generally designated by the numeral 14, whilst FIG. 3(*b*) details a plan view of the pulling mechanism 14. The pulling mechanism 14 consists of the rack 13 which is shown comprising a plurality of notches 15 into which a pawl 16 is adapted to engage. The pawl 16 is pivotally connected to a bridle 17 at pivot point 18. The bridle 17 is able to move back and forth in the directions indicated by arrow 19, in response to the movement of pistons 20 which are operated by hydraulic cylinders 21. A stop pawl 22 is also provided, which is also adapted to engage the notches 15 on the rack 13. The stop pawl 22 is pivotally movable about pivot point 23 such that it may be rotated into and from engagement with the rack 13.

To operate the pulling mechanism 14 the hydraulic cylinders 21 force their respective pistons 20 outwards therefrom, such that the bridle is moved in the direction of arrow 24. With the pawl 16 firmly affixed to the bridle 17 and interengaged in a notch 15 of the rack 13, the rack 13 is also consequently moved in the direction of arrow 24. During this action, the stop pawl is not engaged with a notch 15, but is disposed in the position shown in FIG. 3(*a*). After movement of the rack 13, however, the stop pawl 22 is engaged into a notch 15 to prevent movement of the rack 13 in the direction of arrow 25. The bridle 17 is then moved in direction 25 by the pistons 20 of the hydraulic cylinders 21 and the pawl 16 is engaged with another notch 15 which, for instance, may be one, two or three notches further along the rack 13. This action is then repeated as required to produce a resultant movement of the rack 13 in direction 24. With the machinery attached to the end of the rack 13 as shown in FIG. 1, a bogged or broken machine can therefore be easily towed from a relatively inaccessible mine roadway.

The provision of the arm 6 at an angular disposition engaged to the roof of the roadway, for instance at a 60 to 80 degree angle, prevents slipping movement of the mining extraction device 1 as the machinery 2 is dragged along. Preferably, once the arm 6 is provided at the correct angular position by means of the hydraulic cylinders 7, the arm is fixed against movement by means of heavy pins. It is thus seen that, due to the unique and novel design of the mining extraction device of the present invention an extremely high pulling force can be achieved, the device being capable of pulling a load of several hundred tons.

The mining extraction device of the present invention has been herein described with reference to a particular embodiment. It should be understood that a wide variety of alterations can be made to the present invention. For instance, the hydraulic cylinders may be replaced by a conventional motor or the like at the respective pivot points, or the rack may be replaced by any other type of chain or link structure. Such alternatives should however preferably have the same advantages as the configurations as herein described.

It should be understood that numerous variations and modifications can be made to the mining extractions device without departing from the spirit and scope of the present invention as broadly described herein.

I claim:

1. Apparatus for removing equipment from a mine in the presence of potential further collapse of the roof of the mine, the apparatus comprising:

a base member capable of being moved within the mine to within reach of mining equipment to be removed;

extraction means mounted on said base member and which includes a rack having a first end adapted to be connected to the mining equipment to be removed from the mine, said extraction means further including means for moving said rack relative to said base member for facilitating extraction of the mining equipment; and roof support means for both preventing slipping movement of said extraction means and further collapse of the mine roof as said extraction means extracts the mining equipment, said roof support means including an arm and means for pivotally connecting said arm at a first end thereof to said base member, said arm being adapted for engaging the mine roof at a second end thereof, said arm being adjustable in length and in angular position for enabling attainment of an angle between said base member and said arm of between 60 to 80 degrees, whereby said arm being pivoted at an angle of between 60 and 80 degrees with respect to the base member as said arm engages the mine roof prevents the slipping movement of the extraction means during extraction of the mining equipment and prevents further collapse of the mine roof during the extraction of the mining equipment which might otherwise occur if the roof were not engaged by the arm.

2. An apparatus as claimed in claim 1, wherein said rack is provided with a plurality of notches therealong, said moving means of the extraction means being comprised of a bridle with a pawl pivotally connected thereto, said pawl being correspondingly shaped to engage said notches, such that a two-step motion is defined, a first step being when said bridle is moved in a first direction which causes said pawl to engage with said notches on said rack for corresponding movement of said rack, and, a second step being when said bridle is moved in a second direction which causes said pawl to disengage from said notches allowing relative movement between said rack and said base member.

3. An apparatus as claimed in claim 2, wherein at least one hydraulic cylinder is connected between said bridle and said base member, said hydraulic cylinder being operated to provide movement of said bridle in each of said first and second directions.

4. An apparatus as claimed in claim 2, further comprising a stop mechanism being attached to said base member, said stop mechanism adapted to impede the movement of said rack during said second step of said two-step motion.

5. An apparatus as claim in claim 4, wherein said stop mechanism is comprised of a bridle and a pawl, said pawl of said stop mechanism being adapted to engage one of said notches of said rack during said second step, and adapted to be disengaged from one of said notches during said first step.

6. An apparatus as claimed in claim 1, wherein said arm is adjustable in length by means of a first hydraulic means connected longitudinally therealong.

7. An apparatus as claimed in claim 6, wherein said arm is adjustable in angular position by means of a second hydraulic means connected between said arm and said base member.

8. An apparatus as claimed in claim 7, wherein said moving means of the extraction means is connected to said base member by means of a third hydraulic means.

9. An apparatus as claimed in claim 1, wherein said moving means of said extraction means is connected to said base member by an electric motor.

10. An apparatus as claimed in claim 1, wherein said moving means of said extraction means is adapted to exert a pulling motion on said mining equipment relative to said rack.

11. Method of removing equipment from a mine in the presence of potential further collapse of the roof of the mine, the method comprising the steps of:

moving a base member to a location within reach of mining equipment to be removed;

extracting the mining equipment by moving a rack relative to the base member, the rack having a first end connected to the mining equipment to be removed from the mine; and preventing both slipping movement during the moving of the rack relative to the base member and further collapse of the mine roof as the mining equipment is being extracted, the step of preventing including engaging the mine roof with an arm which is pivotally connected to the base member and attaining an angle between the base member and the arm of between 60 to 80 degrees by adjusting the arm in length and in angular position, whereby the arm being pivoted at an angle of between 60 and 80 degrees with respect to the base member as the arm engages the mine roof prevents the slipping during extraction of the mining equipment and prevents further collapse of the mine roof during the extraction of the mining equipment which might otherwise occur if the roof were not engaged by the arm.

* * * * *